July 23, 1968     P. D. GRIEM, JR     3,393,868

FURNACE CONTROL APPARATUS

Filed May 18, 1966

INVENTOR.
PAUL D. GRIEM, JR.
BY
Staelin & Overman
ATTORNEYS

United States Patent Office 3,393,868
Patented July 23, 1968

3,393,868
FURNACE CONTROL APPARATUS
Paul D. Griem, Jr., Newark, Ohio, assignor to Owens-Corning Fiberglas Corporation, a corporation of Delaware
Filed May 18, 1966, Ser. No. 551,010
20 Claims. (Cl. 236—15)

ABSTRACT OF THE DISCLOSURE

Apparatus for controlling a furnace in which the firing of burners is interrupted and restarted which includes means for providing a signal proportional to a furnace temperature and means for generating a bias signal during an initial portion of a firing period which has a magnitude substantially equal to the deviation of the proportional signal from a level prior to interruption of firing. The two signals are combined in a manner which permits a smooth control of the burners and temperature during the initial portion of a firing period.

---

The present invention relates to furnace control apparatus in general and in particular to furnace control apparatus for furnaces which have one or more sets of burners the firing of which is or are interrupted for short intervals for any reason. Examples of such furnaces are regenerative or blast furnaces.

It has been a practice to melt glass batch or collet in a furnace and flow the molten material into a forehearth in order to supply glass in a flowable condition to one or more feeders associated with the forehearth. The feeders are formed with a plurality of small openings or orifices through which streams of glass flow from the forehearth, providing glass bodies which may be readily attenuated into fibers. The streams or glass bodies may be attenuated into fibers by various means such as by engaging hot gaseous blasts moving at high velocities with primary filaments formed from the streams or engaging the streams directly with blasts of steam or compressed air. If continuous filaments or fibers are desired, the streams may be attenuated by directing the filaments into contact with rapidly rotating pull or nip rolls or the filaments or strand of filaments may be rapidly wound upon a cylindrical sleeve or mandrel into package form, the winding of the strand at high speed providing the force for attenuating or drawing the streams into filaments.

The uniformity and quality of fibers or filaments attenuated from the glass streams or primary filaments formed therefrom are, in large measure, dependent upon the homogenous character of the glass composition wherein the constituents are uniformly distributed and upon the proper control of temperature and viscosity characteristics of the glass adjacent each feeder associated with the forehearth. The evolution of method and means for drawing glass fibers of extremely small diameter has caused great care to be taken with the above items since the diameter of the fibers is dependent upon the foregoing characteristics.

The diameter and uniformity of the fibers is also dependent upon the "head" or glass level in the feeders and thus upon the level of the glass in the furnace supplying the forehearths and feeders. A variation in the "head" or level of glass causes a greater or lower pressure upon the glass bodies being attenuated and thus affects the diameter thereof. There have been developed a number of glass level controls which may vary the level by changing the rate of feeding of solid glass into the furnace for melting. However, the glass level control cannot of and in itself maintain a fine control of the glass level since the pressure within the interior of the furnace may vary from that exterior of the furnace to which the molten glass is being fed, thus, causing a raising or lowering of the glass level and a rippling in the forehearths being fed. For example, an increase in the pressure within the furnace with respect to the pressure exterior to the furnace pushes the glass level down in the furnace and raises the level of the molten glass in the forehearths and feeders. Conversely, a lowering of the pressure within the furnace may cause the glass level to rise within the furnace and the lowering of the glass level in the associated forehearths and feeders.

In furnaces where the operation of the burners is interrupted and then restarted after an elapsed interval, there is a variation of the pressure within the furnace. For example, in the control of a regenerative furnace it is necessary to switch the air supply used for combustion air to the regenerators on each side of the furnace alternately approximately every twenty minutes in some furnaces to provide a new source of heat for preheating the incoming combustion air. That is, when one of the regenerators is acting to heat incoming combustion air the remaining regenerator is acting as an exhaust means and is being heated by the exhaust gases. When the air supply is switched, there is a stoppage insofar as combustion air and gas being fed to the furnace. This results in a significant cooling of the air and thus of the glass within the furnace, sometimes upwards of 100° to 150° F. Further, significant pressure changes result in the furnace when the burners are switched. When using a regenerative furnace, the pressure changes within the furnace and the cooling of the glass or other melt must be accepted as an inherent operating quality of the furnace. However, the furnace may be controlled so that the pressure changes and the temperature changes will be exact and occur in a predicted manner. This enables the provision of relative stability in the pool of melt in predicting thermal eddies, convection patterns, etc. Further, fuel savings may be attained and temperature controlled to the desired degree.

Accordingly, it is an object of this invention to provide an improved furnace control apparatus.

It is a further object of this invention to provide an improved furnace control apparatus which enables the provision of exacting temperature and pressure control within predicted limits within the interior of the furnace and thus closer control of the pool of melt.

A still further object of this invention is to provide an improved furnace control apparatus for a regenerative furnace in which fuel flow during a period of refiring is controlled within a predetermined range to enable faster response, more efficient use of fuel, and better temperature and pressure control in the furnace.

It is to be noted that while the invention will be described herein with reference to a regenerative furnace being utilized for the batch melting of glass that the invention is equally applicable to blast furnaces or other furnaces in which the operation of a set of burners is interrupted and refired after an elapsed interval.

In accordance with the above objects the invention features furnace control apparatus which includes means for supplying fuel to a burner means for a furnace, means for sensing a furnace temperature and providing a signal proportional to the temperature sensed, and control means responsive to the temperature sensing means for controlling the amount of fuel supplied by the fuel supplying means to the burners. Means are further provided for interrupting the firing of the burner means for a predetermined period and restarting the firing of the burner means at the end of the period. To enable a better control as discussed hereinbefore during the refiring period, means are provided responsive to the restarting or refiring for generating an exponential bias signal which is inverse in sign and substantially equal in magnitude to a predicted deviation of the temperature proportional signal from a predetermined level at restarting time. The exponential bias signal and temperature proportional signals are added and fed to the control means which controls the amount of fuel supplied.

The exponential bias signal is a false signal which indicates to the controller that the furnace temperature is actually higher than it is. Thus the controller provides fuel at a steady rate to the burners, improving the stability of the temperature and pressure within the furnace and thus the stability in the pool. The bias signal generating means may be set to provide a bias signal of the same magnitude at each refiring since the characteristics of such a furnace generally remain the same at each refiring. However, in the event that there are disturbances which might change the characteristics of operation of the furnace, or if it is desired to control the refiring period with a greater degree of accuracy, there may be provided means for sensing the temperature drop in the furnace between the interruption and restarting of firing of the burner means and means responsive to the temperature drop sensing means for controlling the initial magnitude of the bias signal. Thus the magnitude of the bias signal is set with exactness at each refiring period.

The invention further features control apparatus for a furnace, which furnace is described in the embodiment disclosed herein and has first and second sets of burners, which includes means for supplying fuel to the sets of burners and means for sensing a furnace temperature and providing a signal proportional to the temperature sensed. Means are provided for firing the first set of burners, interrupting the firing of the first set, firing the second set of burners an interval later, interrupting the firing of the second set and repeating the cycle after a second interval has elapsed. Signal generating means responsive to the firing of a set of burners generates an exponential bias signal which is inverse in sign and substantially equal in magnitude to a predicted deviation of the temperature proportional signal from a predetermined level at firing time. Means are provided for adding the bias and temperature proportional signals. In the embodiment shown, adjustable supply valve means are included responsive to the added signals for controlling the amount of fuel supplied to the burners. Again, means may be provided for sensing the temperature drop in the furnace between the interruption of firing of one set and the firing of another set of burners and means responsive to the temperature drop sensing means may be provided for controlling the initial magnitude of the bias signal.

The control means may include supply control valve means adapted to meter fuel flow therethrough. Control means further includes means for setting the control valve means at selected metering positions. The firing and interrupting means preferably includes timer means operative to produce firing signals and interrupting signals. The firing and interrupting means may further include first and second shut-off valve means responsive to the timer means and located between the fuel supplying means and a first and second set of burners, respectively, in first and second fuel supply lines. First and second burner ignition means may be located adjacent the first and second sets of burners, respectively, and made responsive to the timer means for firing. To avoid the large variations which normally took place whenever refiring started previously, means may be provided for maintaining the supply control valve means at the same metering position through the interval from an interrupting signal to a firing signal so that the supply control valve means may supply fuel initially during a firing period at the same level which it had been supplying prior to interruption. The maintaining means may advantageously be made responsive to the timer means for proper cycling. The bias signal generating means may be reset in response to an interrupting signal from the timer means.

Other objects, advantages and features of the invention will become apparent when the following description is taken in conjunction with the accompanying drawings, in which.

Figure 1:
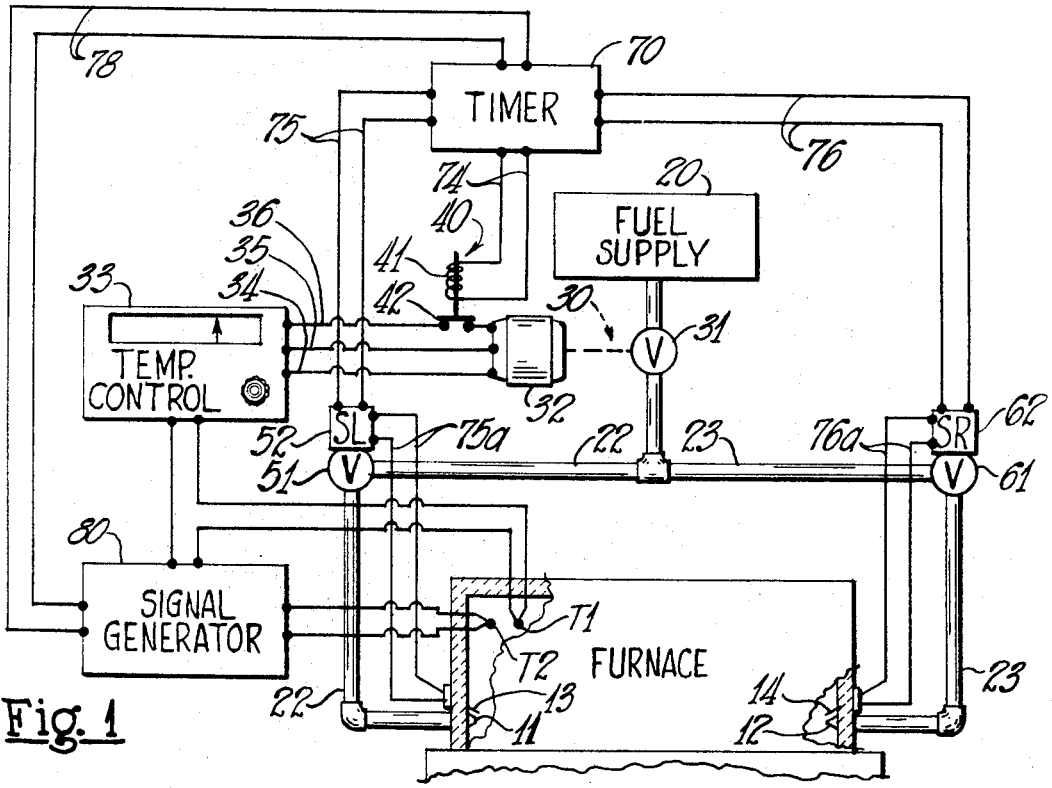
FIGURE 1 is a partially schematic view in elevation of furnace control apparatus embodying the teachings of this invention.

Referring to FIGURE 1, there is illustrated a furnace 10 having two burners or banks or sets of burners 11 and 12. A fuel supply 20 is connected via a main fuel supply line 21 to branch supply lines 22, 23 which conduct fuel to the first or left set of burners 11 and to the second or right set of burners 12, respectively. Means for controlling the amount of fuel supplied to the burners is indicated generally at 30 and includes an adjustable supply valve 31, a motor means 32, and a temperature controller 33. The motor 32 is mechanically linked to drive the supply valve 31 fully open or fully closed or to a selected position between open and closed in order to meter the fuel flow therethrough. The motor means 32 is responsive to the temperature controller 33. A signal may be supplied via lead 34 to cause the motor means 32 to drive the supply valve means more fully open. A signal may be supplied via lead 35 to cause the motor means to drive the supply valve 31 toward a closed position. A lead 36 provides a return or common lead to the temperature controller 33 for the signal leads 34 and 35. In a preferred embodiment of this invention, a relay 40 having an actuating coil 41 and a set of contacts 42 is positioned so that the contacts 42 may open the return lead 36 thus causing the motor 32 to remain at the position selected by the last signal received by the motor 32 on the lead 34 or the lead 35. Thermocouple means T1 provides a means for sensing a furnace temperature and providing a signal proportional to the temperature sensed in the furnace to the temperature controller 33. The furnace temperature sensed may be the atmospheric temperature in the furnace, the temperature of the melt, or any other temperature which will provide an indication of desired operation.

A timer means 70 is operative to control the cycle operation of the furnace 10. That is, the timer means 70 may provide a firing signal via leads 75 to a shut-off valve 51 for burner 11 located in supply line 22. The firing signal via lead 75 may be sent to a solenoid 52 controlling the valve 51 causing the valve 51 to open and fuel to be supplied via line 22 to burner 11. The firing signal may be sent on from the solenoid 52 via leads 75a to an ignition means 13 located adjacent burner 11. Similarly, the firing of burner means 11 may be interrupted by a signal sent from the timer means 70 via leads 75 to de-energize solenoid 52 and thus close shut-off valve 51. Further, the ignition means 13 is de-energized by the interruption signal on leads 75a.

The timer means 70 also may send a firing signal via leads 76 to a shut-off valve 61 operated by a solenoid 62. Upon receiving a firing signal, solenoid 62 opens valve 61 allowing fuel to flow via supply line 23 to the right or second set of burners 12. A signal is also relayed via leads 76a to an ignition means 14 to ignite the fuel issuing from burner 12.

Thus a cycle of operation of the furnace 10 prior to the application of the teachings of this invention is as follows. Assume that the left or first bank of burners 11 is firing. Therefore, solenoid 52 is energized by a signal from the timer 70 to hold the left shut-off valve 51 open. The temperature controller 33 is responsive to the temperature in the furnace 10 via signals received from the thermocouple means T1. The temperature controller 33 thus provides a signal to the control motor 32 to select a metering position of the valve 31 to allow sufficient fuel to be supplied via supply line 22 to the left bank of burners 11 to maintain the temperature in the furnace 10 at a level determined by a setting on the temperature controller 33.

When it is desired to transfer between burners, the left bank firing cycle is ended when the timer 70 provides an interrupting signal via leads 75 to solenoid 52, de-energizing solenoid 52 and closing shut-off valve 51. After a predetermined transfer period, for example twenty seconds, the timer 70 sends a signal via leads 76 to energize solenoid 62 and open valve 61 to allow fuel flow via supply line 23 to burner 12. Simultaneously, a firing signal is carried via leads 76a to the ignition means 14 for the right or second set of burners 12.

In the prior art the above cycle of operation was followed repeatedly to maintain the temperature conditions necessary in the furnace to melt the batch supplied to the furnace.

Figure 2:
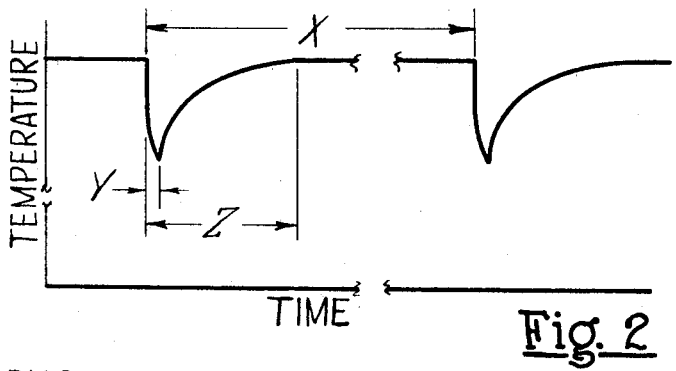
FIGURE 2 is a graph illustrating the temperature-time characteristics of the furnace of FIGURE 1.

Referring to FIGURE 2, there is illustrated a temperature-time characteristic of a furnace such as that shown in FIGURE 1. The time period noted as X is the cycle time between the interruption of firing a burner or separate sets of burners, for example twenty minutes. The time Y indicated in FIGURE 2 is the transfer period between the interruption of the firing of a burner means and the refiring of the burner means, or between the interruption of the firing of a first set or bank of burners and the ignition and firing of a second bank of burners. During this interval the temperature in the furnace drops considerably and may effect the temperature of the glass or other batch being melted so that the batch cools as much as 100° to 150° F. At the end of the transfer period or interval Y the alternate set of burners in FIGURE 1 starts firing and the temperature rises along a path which is characteristic for that particular furnace until the temperature reaches the desired level as set in the temperature controller. This time interval is indicated as Z in FIGURE 2 and in the example stated herein may be from three to four minutes. The thermocouple T1 has sensed the large temperature drop and provides a comparatively large signal to the temperature controller 33. The temperature controller 33 signals the motor means 32 to drive the solenoid valve 31 further open to supply the fuel required to bring the temperature back to the selected norm as quickly as possible. This wastes considerable amounts of fuel and does great damage to the stability of the melted batch in the furnace causing the undesirable effects discussed hereinbefore.

To overcome the difficulties arising after the firing of a bank of burners, a signal generator 80 has been supplied and the timer 70 connected to energize a control motor relay 40. At the beginning of the transfer period Y a signal is forwarded via leads 74 to the control motor relay 40 energizing actuating coil 41 and opening contacts 42 located in the common or return lead 36. This causes the control motor 32 to hold its last position since the control motor 32 cannot receive signals from the temperature controller 33, which, following the signals received from thermocouple T1, would be rapidly driving the supply valve means 31 further open in response to the comparatively large drop in temperature in the furnace. Thus the supply valve 31 maintains its last selected metering position at the time of interruption of firing.

At the end of the transfer period Y a signal is provided from the timer 70 via leads 78 to the signal generator 80 to indicate that the firing of one of the sets of the burners is starting. The timer 70 also de-energizes the relay 40 to close contacts 42 to cause the control motor 32 to be responsive to controller 33.

Figure 3:
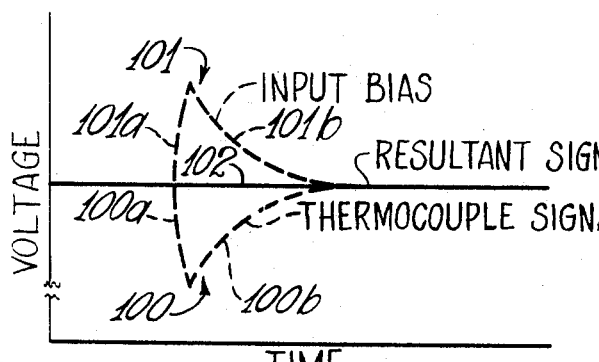
FIGURE 3 is a graph illustrating the voltage-time characteristics of the control apparatus of this invention.

Referring to FIGURE 3, there is illustrated the voltage-time characteristics of the signals received by the temperature controller 33. The dotted curve 100 indicates the temperature drop being sensed by and the information forwarded to the temperature controller 33 from the thermocouple T1. As noted in FIGURE 2, the temperature-time characteristic is exponential in its decay from a certain heat level such as 2600° F. in the atmosphere within the furnace, to a lower temperature at which point the refiring of one of the sets of burners occurs. Similarly, the climb from the lower temperature back to the desired temperature level is also exponential in character. This exponential decay and climb is reflected in the portions 100a and 100b, respectively, of the curve 100 indicating the thermocouple signal received from T1.

In order to put the furnace under tight control to provide the stability desired, the signal generator 80 is utilized to generate an exponential bias signal, shown in FIGURE 3 as dotted curve 101, which is inverse in sign and substantially equal in magnitude to a predicted deviation of the temperature proportional signal 100 from a predetermined level at firing time. The bias and temperature proportional signals are added at firing time before being fed to the temperature controller 33. Therefore, at the end of the transfer period Y the temperature controller sees a resultant signal 102, in FIGURE 3, which is similar to or the same as the signal it was receiving from the thermocouple T1 prior to the interruption of firing of one of the sets of burners. Thus the motor control means 32 and the supply valve means 31 do not fluctuate wildly to try to attain the level desired. Rather the temperature controller 33 and thus the supply valve 31 are under the control of the decaying slope 101b of the false signal 101 provided by the signal generator 80. The furnace is thus smoothly brought up to the temperature desired without the fluctuations, waste of fuel, and hunting problems normally associated with an extreme upset in a servo system. The control cycle is repeated for each firing.

The signal generating means 80 may comprise any of the known resistance-capacitance circuits in which components may be chosen to provide the decaying exponential signal portion 101b.

When the next transfer period comes along, the timer 70 may provide a signal via leads 78 to reset the signal generator 80 at the same time an interruption signal is forwarded. The signal generator 80 may already have the voltage charge necessary at interruption time on the capacitor to attain the magnitude noted on the curve 101 in FIGURE 3. However, the capacitance may be rapidly charged along the leading edge 101a of the curve 101 during the transfer period Y. If this is accomplished to match the decay of signal 100a then the relay 40 need not be used since the added signals 100a and 101a will act as a means for maintaining supply valve 31 at its last selected position. Alternatively, by the use of switching means the R-C network may be charged to the magnitude desired and then the signal released from the signal generating means via contacts in the circuit so that the exponentially rising portion 101a of the curve 101 is not seen by the temperature controller 33. It should be noted that although the use of resistance-capacitance networks may be advantageous in the signal generator, other means such as motor driven rheostats may be used to generate the signal desired.

Since the temperature decay characteristics as reflected in FIGURE 2 and in the thermocouple signal 100 in FIGURE 3 normally remains very similar between transfer periods, the signal generator 80 may be set once to provide the magnitude desired for the input bias signal 101. However, to attain a more exact control and to provide for transient conditions which would cause the single setting of the signal generator to be inappropriate, the signal generator 80 may include thermocouple means T2 for sensing the temperature drop in the furnace between the interruption of firing of one set and the firing of another set of burners. The signal generator 80 then would include means responsive to the temperature drop sensing means for controlling the initial magnitude of the bias signal. That is, by circuits well known in the art the thermocouple T2 may register a temperature drop in terms of voltage, which voltage selects the initial magnitude of the input bias 101 to be applied in additive relationship with the normal temperature sensing signal from thermocouple T1 to the temperature controller 33. Thus the bias signal is accurately set for each transfer interval and very closely controls the operation of the furnace 10.

Although a separate thermocouple means T2 has been shown in FIGURE 1 to supply the information necessary for setting the initial magnitude of the bias for each transfer interval, this has been done primarily for purposes of clarity. The thermocouple T1 is also providing this information and by proper connection may be utilized not only to provide a continuous signal to the temperature controller 33, but to provide the information necessary for resetting the initial magnitude of the bias signal to be supplied during each transfer interval.

In summary it can thus be seen that when an exponential bias signal 101b is provided that is generally complementary to or the inverse of the thermocouple signal 100, the controller 33 receives a substantially constant signal during the start-up or initial firing period of the burners. Accordingly, the fuel flow through supply valve 31 which would otherwise be a surge, will be restrained to a substantially constant value during start up. The controller 33 restrains the fuel flow through valve 31 to the amount being metered therethrough before interruption while the temperature of the furnace is being continually built up. Correspondingly, the furnace temperature sensing thermocouple T1 gradually develops an increased controlling signal as the influence of the bias signal from the signal generator 80 diminishes. This enables the furnace to be controlled as accurately as possible during the upset or restarting or initial firing period, thereby maintaining the stability of the temperature of the furnace and of the molten batch to be controlled as closely as possible.

It should be noted that although a timer is shown in the embodiment in FIGURE 1 as a preferred means for controlling the reversal cycle, or for interrupting and starting the firing of a burner means, this control may be effected by other means. For example, a controller responsive to temperatures in the regenerators may provide the required signals when the temperature of a first regenerator reaches a predetermined value or when the difference in temperatures of the first and a second regenerator reaches a predetermined value. When firing from the opposite direction, the critical temperature sensed may be the temperature of the second regenerator or, again, the temperature difference between the two regenerators.

In conclusion, it is pointed out that while the illustrated example constitutes a practical embodiment of my invention, I do not limit myself to the exact details shown since modification may be made without departing from the spirit and scope of this invention.

I claim:

1. Furnace control apparatus comprising means for supplying fuel to burner means for a furnace, means for sensing a furnace temperature and providing a signal proportional to said temperature, means for interrupting the firing of said burner means and starting the firing of said burner means after an elapsed interval, means responsive to the starting of firing of said burner means for generating a bias signal during an initial portion of a firing period of said burner means having a magnitude substantially equal to the deviation of said temperature proportional signal from its level prior to interruption, means for adding said bias signal and said temperature proportional signal, and means responsive to said added signals for controlling the amount of fuel supplied by said fuel supply means.

2. Apparatus as defined in claim 1 in which said control means includes supply control valve means adapted to meter fuel flow therethrough.

3. Apparatus as defined in claim 2 in which said control means further includes motor means for setting said valve means at predetermined metering positions.

4. Apparatus as defined in claim 3 in which said control means further includes means responsive to said temperature sensing means for driving said motor means.

5. Apparatus as defined in claim 1 in which said interrupting means includes timer means operative to produce an interrupting signal and a restarting signal.

6. Apparatus as defined in claim 5 in which said interrupting means further includes shut-off valve means responsive to said timer means located downstream from said supply control valve means in a supply line for said fuel.

7. Apparatus as defined in claim 5 in which said bias signal generating means is responsive to said interrupting signal to reset.

8. Apparatus as defined in claim 5 in which said bias signal generating means initiates the generating of said bias signal in response to said restarting signal.

9. Apparatus as defined in claim 1 which further includes means for sensing the temperature drop in said furnace between the interruption and restarting of firing of said burner means and means responsive to said temperature drop sensing means for controlling the initial magnitude of said bias signal.

10. Apparatus as defined in claim 1 in which the burner means for a furnace includes first and second sets of burners and in which said interrupting means is operative to interrupt the firing of both sets of burners, start a first set of burners, interrupt the firing of said first set of burners, start a second set of burners, and interrupt the firing of the second set of burners in a repeating cycle.

11. Control apparatus for a furnace having first and second sets of burners comprising means for supplying fuel to the sets of burners; means for sensing a furnace temperature and providing a signal proportional to said temperature; means for firing the first set of burners, interrupting the firing of the first set, firing the second set of burners an interval later, interrupting the firing of the second set and repeating the cycle after a second interval; means responsive to the firing of a set of burners for generating an exponential bias signal inverse in sign and substantially equal in magnitude to a predicted deviation of said temperature proportional signal from a predetermined level at firing time; means for adding said bias and temperature proportional signals; and means responsive to said added signals for controlling the amount of fuel supplied to the burners.

12. Apparatus as defined in claim 11 which further includes means for sensing the temperature drop in the furnace between the interruption of firing of one set and the firing of another set of burners and means responsive to said temperature drop sensing means for controlling the initial magnitude of said bias signal.

13. Apparatus as defined in claim 11 in which said control means includes supply control valve means adapted to meter fuel flow therethrough.

14. Apparatus as defined in claim 13 in which said control means further includes means for setting said control valve means at selected metering positions.

15. Apparatus as defined in claim 11 in which said firing and interrupting means includes timer means operative to produce firing signals and interrupting signals.

16. Apparatus as defined in claim 15 in which said firing and interrupting means further includes first and second shut-off valve means responsive to said timer means and located between said fuel supplying means and the first and second sets of burners, respectively.

17. Apparatus as defined in claim 15 in which said firing and interrupting means further includes first and second burner ignition means responsive to said timer means and located adjacent the first and second sets of burners, respectively.

18. Apparatus as defined in claim 15 which further includes means for maintaining said supply control valve means at the same metering position through the interval from an interrupting signal to a firing signal.

19. Apparatus as defined in claim 18 in which said maintaining means is responsive to said timer means.

20. Apparatus as defined in claim 15 which further includes means responsive to an interrupting signal for resetting said bias signal generating means.

References Cited
UNITED STATES PATENTS

| | | | |
|---|---|---|---|
| 2,359,885 | 10/1944 | Vollrath | 236—15 |
| 2,874,906 | 2/1959 | Nossen | 236—15 |
| 2,931,577 | 4/1960 | Bullen | 236—78 |
| 3,028,095 | 4/1962 | Hornfeck et al. | 236—15 |
| 3,231,802 | 1/1966 | Myers | 236—78 |
| 3,274,375 | 9/1966 | Beltz | 236—46 X |

ROBERT A. O'LEARY, *Primary Examiner.*

W. E. WAYNER, *Assistant Examiner.*